Aug. 14, 1934.    H. R. BEHR    1,970,507
POWER RECTIFYING AND SPEED CONTROL SYSTEM FOR DIRECT CURRENT MOTORS
Filed June 15, 1931    3 Sheets-Sheet 1

Inventor:
Herbert R. Behr

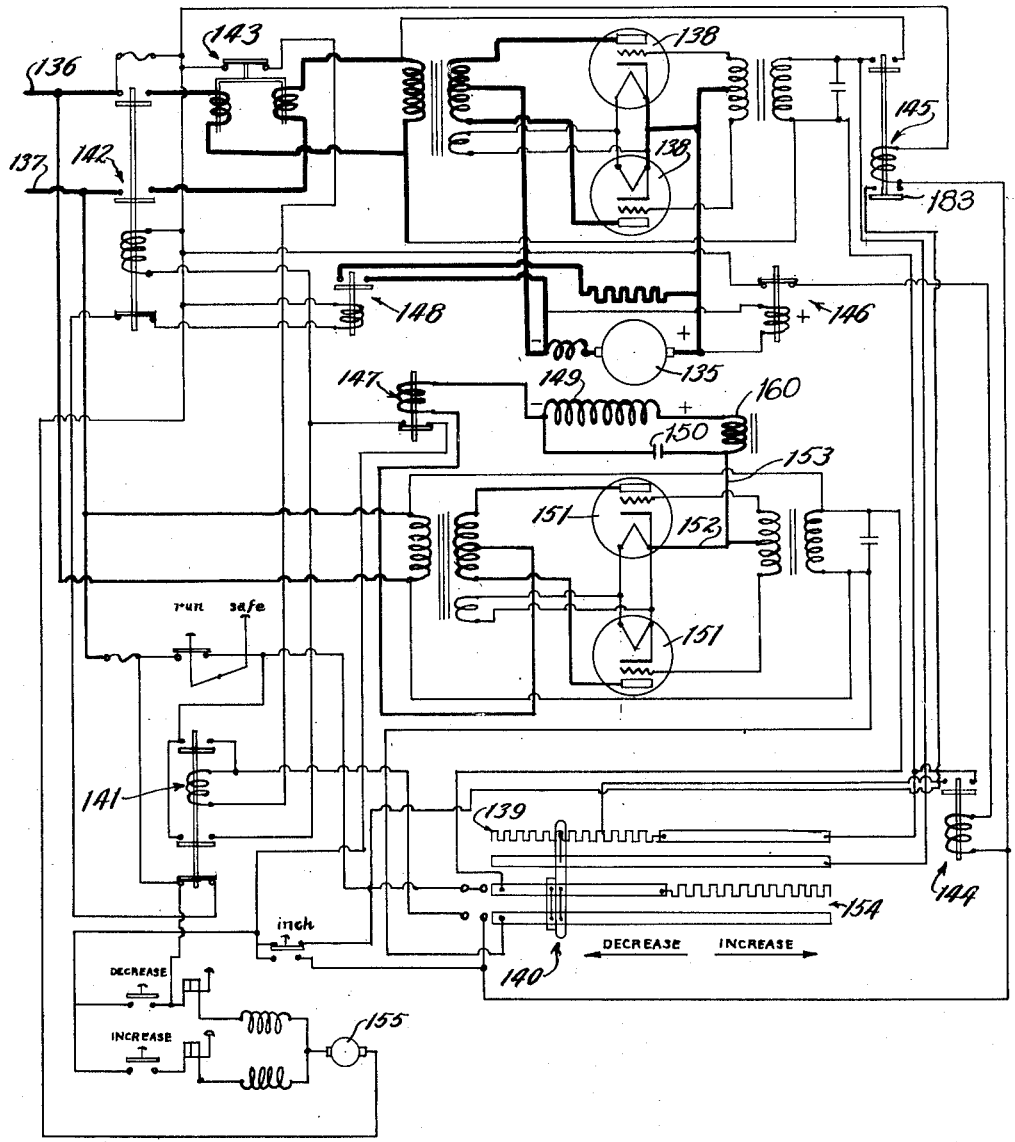

Aug. 14, 1934.  H. R. BEHR  1,970,507
POWER RECTIFYING AND SPEED CONTROL SYSTEM FOR DIRECT CURRENT MOTORS
Filed June 15, 1931   3 Sheets-Sheet 3
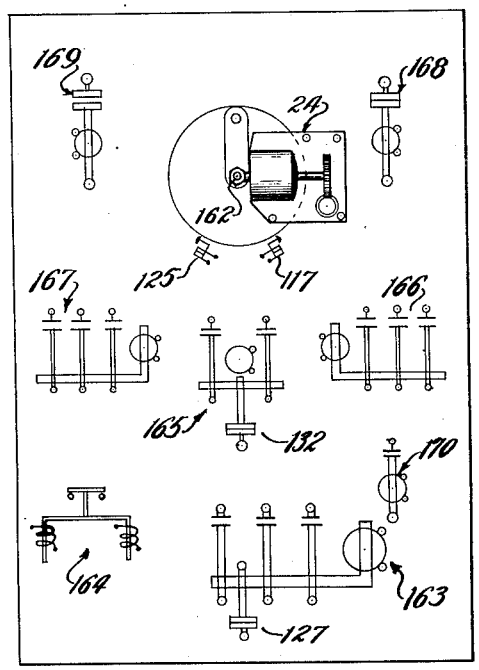
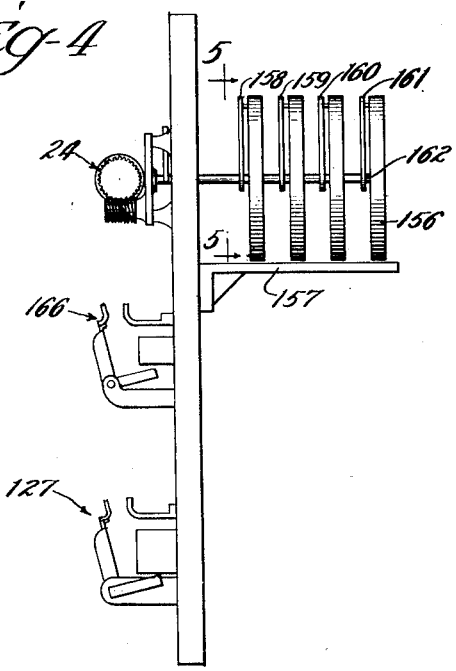
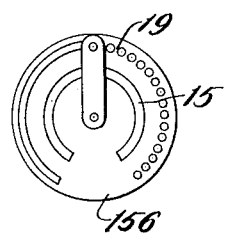
Inventor:
Herbert R. Behr
By: Carl A. Lloyd
Atty.

Patented Aug. 14, 1934

1,970,507

UNITED STATES PATENT OFFICE 1,970,507

POWER RECTIFYING AND SPEED CONTROL SYSTEM FOR DIRECT CURRENT MOTORS

Herbert Richard Behr, Chicago, Ill., assignor to Allan J. Cline, Chicago, Ill.

Application June 15, 1931, Serial No. 544,410

6 Claims. (Cl. 172—179)

This invention relates to a power rectifying and speed control system for direct current motors of the type having separate armature and field windings.

An object of the invention is to provide means whereby a source of alternating current power may be rectified and supplied to the armature and field circuits of a direct current motor at such voltages as will permit control of the motor over a wide range of operating speeds.

Another object of the invention is to provide in a power rectifying and speed control system of the character referred to a group of rheostatic control elements which are adapted to regulate the motor speed over the desired range through the medium of a remote control mechanism which adjusts the resistances to vary the in-put voltages for the motor field and armature circuits in accordance with the speed desired.

Other objects and advantages will be apparent from the following detailed description, which, taken in conjunction with the accompanying drawings, discloses a preferred embodiment thereof.

Referring to the drawings:

Fig. 2 is a wiring diagram illustrating the invention applied to the control of a direct current press drive motor which is supplied from a single phase source of alternating current power;

Fig. 3 is a front elevational view of a control panel upon which are mounted the remote control instrumentalities which regulate the operation of the press motor;

Fig. 4 is a side elevational view of the control panel; and

Fig. 5 is a view through the master control switch taken on line 5—5 of Fig. 4.

Figure 1:
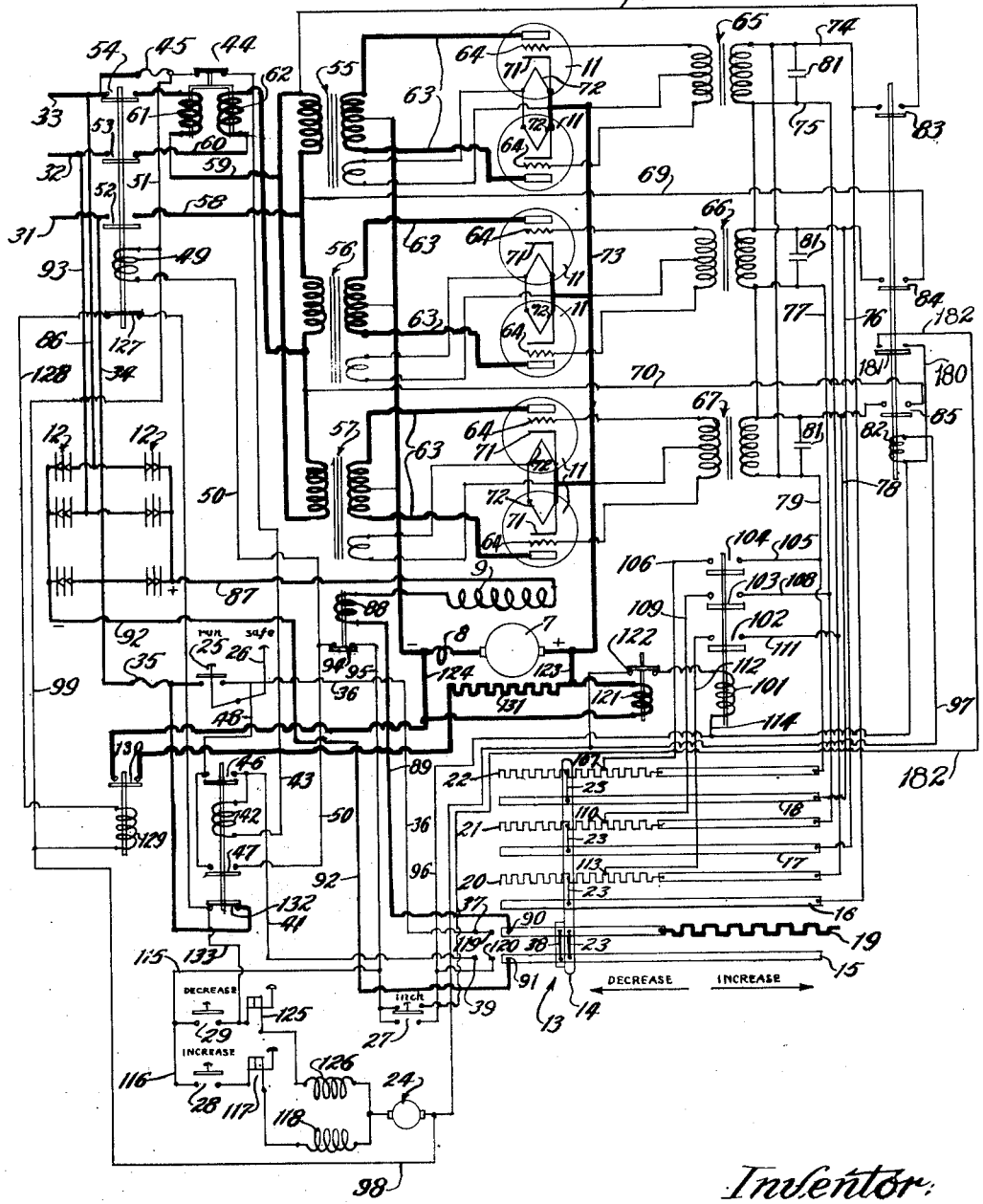
Fig. 1 is a wiring diagram showing the invention applied to the control of a direct current printing press drive motor which is energized from a three-phase source of alternating current power.

The invention is primarily intended to provide improved means for operating a direct current motor from a source of alternating current supply. A direct current motor permits of greater speed variation than is obtainable with an alternating current motor and hence its use in many cases is to be preferred to the use of alternating current motors. This is particularly true in the case of newspaper press drive motors. Frequently, however, the district where it is desired to use the motor is only furnished with an alternating current supply. By the use of the invention, direct current equipment is readily made available for use in alternating current districts.

Briefly the invention, as applied to a direct current shunt wound motor, contemplates the use in the armature circuit of the motor of a group of thermionic rectifiers for converting the alternating current supply into direct current. Separate rectifying means is provided for the field circuit of the motor in the form, either of a group of thermionic rectifiers, or a group of metallic oxide rectifiers. The desired speed variation is obtained by regulating the direct current output voltages of the armature and field circuit rectifiers, this regulation being obtained by the use of a group of rheostatic control elements, the circuits of which are commutated with the rectifier circuits by means of a master switch which may be operated by remote control means, such for example, as a pilot motor drive mechanism.

The circuit arrangement employed for using the invention in connection with a press drive motor which is energized from a three-phase power line will first be described, reference for this purpose being had to Fig. 1. In this figure the numeral 7 designates the press drive motor, which is of the direct current, shunt wound type, having a series field 8 and a separate field winding 9. The thermionic rectifiers for converting the alternating current to direct current for the armature circuit of the motor 7 are indicated by the numeral 11, and the metallic oxide rectifiers, which supply power from the alternating current line to the field of the motor, are indicated generally by the numeral 12. The master switch is indicated generally by the numeral 13, and includes a movable contact arm 14 and four stationary contact arms 15, 16, 17, and 18. The rheostatic control elements which are operated by the master switch to control the out-put voltages of the rectifiers are four in number, the one employed for controlling the field voltage being indicated by the numeral 19, and the three employed for regulating the out-put voltage of the rectifiers which supply the armature circuit being indicated by the numerals 20, 21, and 22. The stationary contact arms 15—18 are associated with their respective rheostatic elements 19—22 through the master switch arm 14 which carries jumpers 23 for completing the circuits between these parts.

The master switch arm 14 is moved by a pilot motor 24, either to the right or to the left, to effect a speed change of the press drive motor, movement to the right effecting a speed increase, and movement to the left effecting a speed decrease. The usual control buttons for controlling the operation of the press are shown, the legend associated with each button indicating the function which it performs. The run button is indicated at 25, it being mechanically interlocked with a safe button 26. The inch button is indicated at 27, and the increase and decrease buttons are indicated, respectively, by the numerals 28 and 29.

The necessary circuits for varying the speed of motor 7 through the instrumentalities just described, will be best understood by following the function performed upon actuation of the several control buttons.

In accordance with the usual press operation, it is first necessary to depress run button 25 before inaugurating the other press operations. Closing of run button 25 supplies current from wire 31 of the three-phase power supply line, represented by wires 31, 32, and 33, through wire 34, fuse 35, and the terminals of the run button switch to wire 36, which connects with terminal 37 of the master switch. It will be understood that before the run button is depressed, the master switch arm 14 is positioned to the extreme left, so that upon depression of the run button, current flows from terminal 37 through a jumper 38 to terminal 39, the jumper 38 forming a part of the master switch arm 14. From terminal 39 current flows through wire 41 to the coil 42 of a low voltage relay, and from thence through wire 43, through the contacts of an over-load relay 44 and a fuse 45, to wire 33 of the main power supply. Energizing of coil 42 of the low voltage relay closes its contacts 46 and 47. The closing of contacts 46 establishes a holding circuit for relay coil 42 through wire 48, thus holding in this relay.

Closing of contacts 47 energizes a coil 49 of an electromagnetic switch, the supply to said coil being through wire 50 and the return to the power line being by way of wire 51 and fuse 45. Energizing of coil 49 closes its three sets of contacts 52, 53, and 54. The closing of these three sets of contacts supplies alternating current power from main line wires 31, 32, and 33 to the primaries of three power transformers 55, 56, and 57, the supply of power to these primaries being through wires 58, 59, and 60, the former leading directly from contacts 52 to the primary circuit, and the two latter connecting with said primary circuit after first connecting, respectively, with coils 61 and 62 of the over-load relay. Depressing of the run button 25 thus serves to energize the primaries of transformers 55, 56, and 57, the secondaries of which energize the plate circuits 63 of rectifying valves 11.

These valves are preferably of the hot cathode, gas-filled type having control grids 64 upon which an alternating current potential is impressed through transformers 65, 66, and 67. The primaries of these control grid transformers are supplied from the primary circuits of the plate circuit transformers, the connections being through wires 68, 69, and 70. The cathodes 71 of the rectifying valves are heated indirectly through heating elements 72, which are energized through auxiliary secondary windings on the plate supply transformers 55, 56, and 57.

Hot cathode rectifying valves of the gas-filled type, having control grids adapted to receive an alternating current supply, are known in the art, and at the present time tubes of this type are available which are capable of handling 250 amperes of current. Tubes of this type have a low resistance, and hence, a low internal loss. The phase relation between the grid and plate voltages determines the amount of current which passes through the tube. Therefore, by controlling the phase angle of the grid voltage, the amount of current supplied by the tube may be directly controlled. This phase shift of the grid voltage is accomplished, in the present instance, by adjusting rheostatic elements 20, 21, and 22 in a manner presently to be explained.

The tubes are grouped in parallel, as shown, two tubes being used on each phase. One tube of each group handles the upper half of the wave, and the other tube handles the lower half of the wave, this grouping thus giving full wave rectification. Cold cathode tubes of this type are also known at the present time. However, as yet they have not been made in sizes capable of handling the quantities of power which can be handled in the hot cathode type of gas-filled tube. It is not intended, however, to restrict the invention to the hot cathode type of tube, inasmuch as the same principle of motor speed control could be carried out by the use of the cold cathode type of tube in which case the out-put voltage could be similarly controlled by adjusting the phase angle of the grid voltage.

The out-put circuits of the rectifier tubes 11 are connected directly through wire 73 to the armature circuit of motor 7. The effective direct current voltage which is thus supplied to the armature of the motor 7 depends upon the amount of current passing through the rectifying tubes. This is regulated to adjust the speed of the motor over the desired range by shifting the phase angle of the grid voltage. To this end the primaries of transformers 65, 66, and 67 are separately connected in circuit, respectively, with rheostatic control elements 20, 21, and 22. Wires 74 and 75 form the circuit between the primary of transformer 65 and control element 20; wires 76 and 77 form the circuit between the primary of transformer 66 and control element 21; and wires 78 and 79 form the circuit between the primary of transformer 67 and control element 22. Condensers 81 are connected in parallel with the primaries of the grid control transformers.

It will be evident that as the master switch arm 14 advances from its position at the extreme left, portions of the resistances 20, 21, and 22 will be progressively removed from the primary circuits of the control grid transformers. The effect of this is to shift the phase angle of the grid voltage so as to progressively increase the effective direct current out-put voltage which is supplied to the armature circuit of motor 7. This voltage increase progressively increases the speed of the motor as the switch arm moves toward the right under the action of pilot motor 24. The reverse effect takes place upon movement of the master switch arm in the decrease direction.

Closing of the run button circuit merely closes the power supply to the plate circuit transformers 55, 56, and 57 of rectifying valves 11. Current is not supplied at this time to the control grid transformers 65, 66, and 67 inasmuch as these circuits are held open at this stage by a run relay, the coil of which is indicated at 82, and the three pairs of contacts of which are indicated at 83, 84, and 85. Until these contacts are closed, the valves 11 are inactive so that the armature circuit of the motor is not supplied with power.

The field circuit of motor 7 is supplied with power immediately upon the closing of a main line switch (not shown) interposed in wires 31, 32, and 33. Upon the closing of this switch, current flows from wires 31 and 33 through wires 34 and 86, respectively, to the metallic oxide rectifiers 12, from which the rectified current is conducted by wire 87 through field coil 9 to energize the motor field. The return from field coil 9 is through the coil 88 of a magnetic relay, and a wire 89, to a terminal 90 on control element 19. From terminal 90 the return is carried through jumper 23 to a terminal 91, and is completed through wire 92 to the group of oxide rectifiers which in turn connect through a wire 93 with wire 32 of the main line. The flow of current through coil 88 of the magnetic relay closes its contacts 94 which connect wire 50 with a wire 95, from which point current is taken to permit the other functions of the control to take place by means of their respective push buttons. As previously noted, current does not flow through the armature circuit upon the closing of the run button. The field of motor 7 is, however, energized upon closing of the main line switch (not shown) and, by energizing coil 88, supplies current to wire 95 to permit closing of the motor armature circuit by the other button controls. The magnetic relay in the field of the motor circuit thus provides positive means for preventing closing of the motor armature circuit before the field is energized. Were the motor armature circuit closed with the field open, the motor would be ruined.

The operations of inching or jogging the press drive motor, and also increasing or decreasing the speed of said motor, will now be described. Closing inch button 27 supplies current from wire 95 through wire 96 to coil 82 of the run relay, the return to the main line being through wires 97, 98, 99, 51, and fuse 45. Energizing of coil 82 closes contacts 83, 84, and 85, and this in turn closes the motor armature circuit by applying alternating current voltage to the grids of valves 11.

Inasmuch as a high torque start is desired for inching purposes, an inch relay is interposed in the primary circuits of the control grid transformers to short out a portion of rheostatic elements 20, 21, and 22. The coil of this relay is indicated at 101, and the three pairs of contacts are indicated at 102, 103, and 104. Contacts 104 are connected in circuit with the primary of transformer 67 by a wire 105 and a wire 106, the latter terminating in an intermediate point 107 on resistance element 22. Contacts 103 are connected in circuit with the primary of transformer 66 by wires 108 and 109, the latter terminating at a terminal 110 on resistance element 21. Contacts 102 are, in like manner, connected in circuit with the transformer 65 through wires 111 and 112, the latter terminating at a terminal 113 on resistance element 20. It will be apparent that when the inch relay is closed, the portions of resistance elements 20, 21, and 22 appearing to the left, respectively, of points 113, 110, and 107, will be removed from the corresponding primary circuits of the control grid transformers to give the necessary high torque start. Coil 101 of the inch relay is energized upon depression of the inch button, current being supplied thereto through wire 114, which connects with wire 96 which also feeds coil 82 of the run relay. Depression of the inch button thus closes both the inch and run relays to give the high torque start. It will be understood that during the inching operation, master switch arm 14 remains at its extreme left position with jumper 23 bridging terminals 90 and 91. Upon release of the inch button, both the inch and run relays are opened, thereby opening the armature circuit and causing the motor to come to a stop, the motor rotating at inching speed only so long as the inch button is held depressed.

Depressing increase button 28 supplies current from wire 95 by way of wires 115 and 116 through the closed contacts of an increase limit switch 117 to a field coil 118 of pilot motor 24. This starts the pilot motor which proceeds to move switch arm 14 in the increase direction. The first result of the advance movement of the switch arm is to bridge terminals 119 and 120 through jumper 38, thereby shunting the inch button circuit and closing the inch and run relays to give the high torque start in the same manner as described in connection with the inching operation. This shunt circuit for the lower pair of contacts of inch button 27 is traced from wire 95 through wires 115, 116, increase button 28, coil 118, motor 24, wire 97, coil 82 and wire 96 to terminal 120, the latter connecting through jumper 38 to terminal 119, from which point the shunt circuit is traced through wire 36, wire 48, contacts 47, wire 50 and contacts 94 back to wire 95. The advance of arm 14 beyond the position where jumper 38 approaches terminals 119 and 120 does not interrupt the circuit to coil 82 of the run relay as this circuit is then maintained by an interlock, the circuit of which is traced from coil 82 through a wire 180, a contactor 181, a wire 182, the upper contacts of inch button 27, wire 95, contactor 94, and wire 50 to contactor 47 of the low voltage relay from which the return to the main line is completed through wire 48, run button 25, fuse 35, and wire 34.

During further advance movement of switch arm 14 the inch relay coil 101 is de-energized to open the high torque starting circuit, this being accomplished by an accelerating relay, the coil of which is indicated at 121, the contacts being indicated at 122. Coil 121 is connected into the motor armature circuit through wires 123 and 124 and is energized by the counter E. M. F. generated by motor 7 when a certain speed is reached. Opening of contacts 122 opens the return circuit of inch relay coil 101 to interrupt the high torque starting circuit. As arm 14 continues to advance it reduces simultaneously resistances 20, 21, and 22, in the control grid circuits, thus resulting in increase in the voltage supplied to the motor armature to gradually bring the motor to its normal full field speed. Further advance of arm 14 progressively introduces resistance element 19 into the field circuit, the effect of which is to gradually increase the motor speed up to its maximum value. When the arm reaches the limit of its travel in the advance direction, it opens the contacts of increase limit switch 117, thereby opening the circuit to pilot motor 24 and preventing further advance movement of the arm.

The control grid resistors 20, 21, and 22, and the field resistor 19 are so grouped that they may be commutated by switch arm 14 in such a way that the cycle of operation of the tube grid voltage control range is completed before further acceleration is obtained by adjusting the shunt field resistor. The reverse order of control obtains during the decelerating period when arm 14 moves in the decrease direction. This is accomplished by depressing decrease button 29 which establishes the circuit from wire 95 through wire 115 and the closed contacts of a decrease limit switch 125 to a field coil 126 of pilot motor 24. This causes reverse rotation of motor 24 which moves control arm 14 toward its minimum speed position, thus reversing the sequence of operations described in connection with the increase button control circuit. When the control arm reaches its minimum speed position, it opens the contacts of decrease limit switch 125, thus opening the circuit to the pilot motor and preventing further movement of switch arm 14 in the reverse direction.

Switch arm 14 may be brought to rest at any point between its minimum and maximum speed positions by releasing the increase button, whereupon the drive motor will continue to run at a predetermined speed until safe button 26 is depressed to stop the motor. Depressing the safe button opens the circuit from main line wire 31 through wire 34, fuse 35, and wire 48 to contacts 46 and coil 42 of the low voltage relay. De-energizing coil 42 opens contacts 47 which in turn, through wire 50, de-energizes coil 49 of the main line electromagnetic switch which controls the current supply to the motor armature circuit rectifiers. As the power supplied to the motor is thus interrupted, a dynamic braking is provided by the closing of an interlock 127 which, through wire 128, completes the circuit through a coil 129 of a magnetic contactor, the contacts of which are indicated at 130. The closing of the contacts 130 shorts a resistor 131 across the armature of motor 7 and the series field 8 to provide the dynamic braking for bringing the motor to a quick stop.

Depression of the safe button, in addition to opening the power supply to the motor armature circuit and providing dynamic braking, also closes back contacts 132 of the low voltage relay, the effect of which is to close the circuit through wire 133 and field coil 126 of pilot motor 24, thereby causing the latter to operate in the reverse direction to return switch arm 14 to its minimum speed position. When this position is reached the pilot motor is stopped by the opening of the decrease limit switch 125 and the dynamic braking circuit is again opened by opening contacts 130 when the circuit to coil 129 is interrupted, this being effected by opening of decrease limit switch 125.

The circuits are protected against overloading by coils 61 and 62 of the over-load relay which operates to open contacts 44 to interrupt the current supplied to the low voltage relay coil 42. Opening of this coil shuts down the entire control and the motor. An interruption of the power circuit or an excessive drop in the line voltage will open the low voltage relay which shuts down the entire control equipment and the motor.

One of the important features of the circuit is the arrangement of the armature circuit rectifiers so that they do not become active until either the inch or increase button circuits are closed. As previously explained, upon the depression of either the inch or increase buttons there is established a circuit to the control grids, this circuit being effected by the closing of both the inch and run relays to provide a high torque start. This arrangement effects a considerable saving in wear on the rectifying valves since they are not energized until actual running of the press is required.

In Fig. 2 I have shown an embodiment of the invention similar to the embodiment shown in Fig. 1 but with the difference, however, that instead of employing metallic oxide rectifiers in the motor field circuit, I have illustrated the use of thermionic rectifiers for this circuit, as well as for the armature circuit. To avoid unnecessary complication, I have shown the invention in this case as applied to a single-phase alternating current power line. The principle of motor speed control for the embodiment shown in Fig. 2 is essentially the same as for Fig. 1, and hence a detailed description of the button control circuits will not be given.

Referring to Fig. 2, the direct current press drive motor is indicated at 135. The armature circuit is supplied with rectified alternating current power from main line wires 136 and 137 through a pair of thermionic rectifiers 138, the out-put voltage of which is determined by the phase angle of the grid voltage, this being in turn controlled by adjusting rheostatic control element 139 from master switch 140. The low voltage relay is indicated at 141, the main line electromagnetic switch at 142, the over-load relay at 143, the inch relay at 144, the run relay at 145, and the accelerating relay at 146. These parts correspond to similar parts described in connection with Fig. 1 and their functions need not here be described in detail. The same is true of the armature protective relay indicated at 147, the dynamic braking relay which is indicated at 148, and the run relay interlock contactor 183.

Continuing the reference to Fig. 2, the field coil 149 of the motor, instead of being supplied with direct current through a group of metallic oxide rectifiers, as in Fig. 1, is supplied with rectified current from a pair of thermionic rectifying tubes or valves 151 which are of the type described in connection with Fig. 1. These valves are grouped to give full wave rectification in the same manner as described in connection with the valves of Fig. 1. The direct current out-put of valves 151 is supplied to field coil 149 through wires 152 and 153. A filter system comprising a condenser 150 and a coil 160 is interposed between wire 153 and the field coil to remove pulsations in the rectified current. The voltage out-put of valves 151 is regulated to control the speed of the motor by adjusting the phase angle of the grid voltage through a rheostatic control element 154. Rheostatic elements 139 and 154, which regulate the voltages of the armature and field rectifiers, respectively, are so grouped that as the master switch arm moves in the increase direction, it completes the cycle of control operations for the armature circuit before starting the cycle of operations for the field circuit. This commutation of circuits is obtained through master switch 140 and pilot motor 155 which together serve as a means for remote control of the motor speed. The control buttons, which are indicated by the legends, perform functions similar to those described in connection with Fig. 1. Their mode of operation will be readily understood from the diagram, in view of the description given in connection with Fig. 1.

In Figs. 3–5 I have shown a convenient form of control panel adapted to be used in connection with the circuit arrangement shown in Fig. 1 for the remote control of the press drive motor. The rheostatic control elements 19, 20, 21, and 22 are arranged on circular supporting plates 156 which rest on a bracket 157 carried by the panel. The master switch arm is arranged in four parts, 158, 159, 160, and 161, which co-operate, respectively, with rheostatic elements 19, 20, 21, and 22, said switch arm parts being rigidly secured to turn with a pilot motor driven shaft 162 which is driven through suitable gear connections from pilot motor 24, the latter being mounted on the front of the panel. The rheostatic control elements are thus all arranged for actuation through the master switch and the pilot motor.

The panel also carries in addition to the pilot motor and rheostatic control elements, increase and decrease limit switches 117 and 125, main line electromagnetic switch 163, overload protective relay 164, low voltage relay 165, inch relay 166, run relay 167, accelerating relay 168, field protective relay 169, and dynamic brake switch 170. Main line electromagnetic switch 163 includes interlock 127, and low voltage relay 165 includes back contacts 132. The push button controls are ordinarily located on one of the uprights of the press frame.

While I have shown the invention as applied to the control of a printing press motor, it will be apparent that it has useful application in other arts where there is need for motors having a wide range of operating speeds, as for example, in elevator control systems, paper making machines, and the like.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. In a control system for a direct current press drive motor having a separate armature and field windings, the combination of a source of alternating current supply, a rectifying valve interposed between said source and the motor armature, said valve including an anode, a cathode, and a control grid, speed control means associated with the grid circuit of said valve for regulating the voltage at which current is supplied to the motor armature, whereby to vary the speed of the motor, a field circuit rectifier, a run switch, a low voltage relay connected in circuit with said switch, a contactor operated by said relay to close the in-put circuit to said valve, a second contactor for closing the grid circuit of said valve, a run relay for operating said grid circuit contactor, an inch circuit associated with said run relay for actuating the latter to start operation of the motor at slow speed, an operating circuit associated with said run relay and arranged to actuate the latter independently of the inch circuit to start operation of the motor at slow speed, and means rendering said speed control means operative to increase the speed of the motor upon closing of said operating circuit.

2. In a control system for a direct current press drive motor having separate armature and field windings, the combination of a source of alternating current supply, a rectifying valve interposed between said source of supply and the motor armature circuit, said valve including an anode, a cathode, and a control grid, speed control means including a rheostatic element for regulating the voltage at which current is supplied to the motor armature, a field circuit rectifier, an inch circuit including a relay arranged to adjust said rheostatic element to give the motor a relatively slow high-torque starting speed, an operating circuit arranged to actuate said relay independently of said inch circuit to effect slow high-torque start of the motor, and means rendering said speed control means operative to increase the speed of the motor following a closing of said operating circuit.

3. In a control system for a direct current press drive motor having separate armature and field windings, the combination of a source of alternating current supply, a rectifying valve interposed between said source and the motor armature, said valve including an anode, a cathode, and a control grid, speed control means including a rheostatic element associated with the grid circuit of said valve for regulating the voltage at which current is supplied to the motor armature, a field circuit rectifier, a run switch, a low voltage relay connected in circuit with said run switch, a run relay for closing the grid circuit of said valve, an inch circuit including a relay arranged to adjust said rheostatic element to give the motor a relatively slow high-torque starting speed, an operating circuit arranged to actuate said inch relay independently of said inch circuit to effect a slow high-torque start of the motor, and a pilot motor-operated master switch operative upon closing of said operating circuit to adjust said rheostatic element, whereby to increase the speed of the motor.

4. In a control system for a direct current press drive motor having separate armature and field windings, the combination of a source of alternating current supply, a rectifying valve interposed between said source and the motor armature, said valve including an anode, a cathode, and a control grid, speed control means including a rheostatic element associated with the grid circuit of said valve for regulating the voltage at which current is supplied to the motor armature, a field circuit rectifier, a run switch, a low voltage relay connected in circuit with said run switch, a run relay for closing the grid circuit of said valve, an inch circuit including a relay arranged to adjust said rheostatic element to give the motor a relatively slow high-torque starting speed, an operating circuit arranged to actuate said inch relay independently of said inch circuit to effect a slow high-torque start of the motor, means rendering said speed control means operative to increase the speed of the motor following a closing of said operating circuit, and an accelerating relay associated with said inch relay for disabling the latter when the motor attains a predetermined speed.

5. In a control system for a direct current press drive motor having separate armature and field windings, the combination of a source of alternating current supply, a rectifying valve interposed between said source and the motor armature, said valve including an anode, a cathode, and a control grid, speed control means including a rheostatic element associated with the grid circuit of said valve for regulating the voltage at which current is supplied to the motor armature, a field circuit rectifier, a run switch, a low voltage relay connected in circuit with said run switch, a run relay for closing the grid circuit of said valve, an inch circuit including a relay arranged to adjust said rheostatic element to give the motor a relatively slow high-torque starting speed, an increase circuit arranged to actuate said inch relay independently of said inch circuit to effect a slow high-torque start of the motor, a decrease circuit, and means rendering said speed control means operative to increase the speed of the motor following a closing of the increase circuit, said means being further operative to cause said control means to decrease the motor speed upon closing of said decrease circuit.

6. In a control system for a direct current press drive motor having separate armature and field windings, the combination of a source of alternating current supply, a rectifying valve interposed between said source and the motor armature, said valve including an anode, a cathode, and a control grid, speed control means including a rheostatic element associated with the grid circuit of said valve for regulating the voltage at which current is supplied to the motor armature, a field circuit rectifier, a run switch, a low voltage relay connected in circuit with said run switch, a run relay for closing the grid circuit of said valve, an inch circuit including a relay arranged to adjust said rheostatic element to give the motor a relatively slow high-torque starting speed, an increase circuit arranged to actuate said inch relay independently of said inch circuit to effect a slow high-torque start of the motor, a decrease circuit, and a pilot motor-operated master switch associated with said rheostatic element for effecting increase in speed of the motor upon closing of the increase circuit and decrease in speed of said motor upon closing of said decrease circuit.

HERBERT RICHARD BEHR.